(12) United States Patent
Date et al.

(10) Patent No.: US 11,487,154 B2
(45) Date of Patent: Nov. 1, 2022

(54) LIGHT SOURCE DEVICE AND DISPLAY DEVICE

(71) Applicant: NIPPON TELEGRAPH AND TELEPHONE CORPORATION, Tokyo (JP)

(72) Inventors: Munekazu Date, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/281,986

(22) PCT Filed: Oct. 28, 2019

(86) PCT No.: PCT/JP2019/042218
§ 371 (c)(1),
(2) Date: Apr. 1, 2021

(87) PCT Pub. No.: WO2020/095749
PCT Pub. Date: May 14, 2020

(65) Prior Publication Data
US 2021/0341792 A1 Nov. 4, 2021

(30) Foreign Application Priority Data
Nov. 9, 2018 (JP) .............................. JP2018-211702

(51) Int. Cl.
*G02F 1/13357* (2006.01)
*G02F 1/1335* (2006.01)
(Continued)

(52) U.S. Cl.
CPC ..... *G02F 1/133607* (2021.01); *G02B 6/0051* (2013.01); *G02B 6/0061* (2013.01); *G02F 1/133603* (2013.01); *G02F 1/1326* (2013.01)

(58) Field of Classification Search
CPC ......... G02F 1/133607; G02F 1/133603; G02B 6/0051; G02B 6/006
See application file for complete search history.

(56) References Cited

U.S. PATENT DOCUMENTS

2001/0046134 A1* 11/2001 Masaki ................ G02B 5/0215
362/330
2010/0276718 A1* 11/2010 Chang ............... G02F 1/133603
257/98
(Continued)

FOREIGN PATENT DOCUMENTS

| JP | 2008300206 A | 12/2008 |
|---|---|---|
| JP | 2012043671 A | 3/2012 |
| JP | 2018170154 A | 11/2018 |

OTHER PUBLICATIONS

Munekazu Date et al., Full paralac table top display with visually equivalent light field 3D, Proceedings of The Virtual Reality Society of Japan 2018, Sep. 2018.
(Continued)

*Primary Examiner* — Julie A Bannan
(74) *Attorney, Agent, or Firm* — Kenja IP Law PC

(57) ABSTRACT

Light having high directivity and high uniformity is emitted. A light source apparatus (10) according to the present invention includes: a light emitting body group (11a) in which a plurality of light sources (11) that emit directional light are arranged on one surface; and a first visual field limiting film (12) that is provided on an optical path of the light emitted from the plurality of light sources (11), and outputs light that enters the first visual field limiting film in
(Continued)

a first predetermined angular range by homogeneously diffusing the light within the first predetermined angular range.

5 Claims, 12 Drawing Sheets

(51) Int. Cl.
  *F21V 8/00* (2006.01)
  *G02F 1/13* (2006.01)

(56) References Cited

U.S. PATENT DOCUMENTS

2013/0057806 A1* 3/2013 Kanemitsu ........ G02F 1/133606
  349/64
2018/0288844 A1 10/2018 Fujii

OTHER PUBLICATIONS

Nov. 26, 2019, International Search Report issued in the International Patent Application No. PCT/JP2019/042218.
opto-design.com, Retrieved on Oct. 2, 2018, from URL: http://www.opto-design.com/products/unibrite.

* cited by examiner

LIGHT SOURCE DEVICE AND DISPLAY DEVICE

TECHNICAL FIELD

The present invention relates to a light source apparatus and a display apparatus.

BACKGROUND ART

A display apparatus such as a liquid crystal display performs illumination with use of a light source apparatus such as a backlight from a rear surface of a light modulation element such as a liquid crystal panel and controls the transmittance of light of each pixel of the light modulation element, to thereby cause an image having the luminance in accordance with the transmittance of each pixel to be observed.

NPL 1 discloses a display apparatus with which a three-dimensional image can be observed with the naked eye. In this display apparatus, a parallax barrier is provided between a backlight and a liquid crystal panel, and the observation of the three-dimensional image with the naked eye is enabled by modulating light passing through the parallax barrier by the liquid crystal panel and causing an observer to observe the modulated light.

In general, the transmittance of light of a liquid crystal panel is about a few percent. When the light passes through a parallax barrier as in the display apparatus disclosed in NPL 1, the transmittance further decreases and becomes a fraction to a few tenths of the transmittance. Therefore, in order to cause the observer to observe an image having a sufficient luminance, the luminance of the backlight needs to be very high. However, there is a problem in that the power consumption increases when the luminance of the backlight is very high. There is also a problem in that the luminous flux is not sufficient in a general high-luminance light emitting diode (LED), and the formation of a backlight having an extremely-high luminance as above itself is difficult.

NPL 2 discloses a light source apparatus including a box-like flatter, a light source such as an LED provided on the bottom surface of the flatter, a light-conductive reflection plate that covers an opening of the flatter, and a diffusion plate disposed so as to face the light-conductive reflection plate. In the light source apparatus, light emitted from the LED exits the light-conductive reflection plate while being multi-reflected between the inner surface of the flatter and the light-conductive reflection plate, and the light is diffused in a predetermined angular range by the diffusion plate so that isotropic light is output. However, even in the light source apparatus disclosed in NPL 2, sufficient luminance cannot be obtained for the use for the display apparatus as described above.

CITATION LIST

Non Patent Literature

[NPL 1] Munekazu Date, Megumi Isogai, Hideaki Kimata, "Full Parallax Table Top 3D Display Using Visually Equivalent Light Field", 2018 Proceedings of the Virtual Reality Society of Japan, (2018)

[NPL 2] "UniBrite (direct LED flat illumination)", [online], [searched on 19 Oct. 2018], internet <URL: http://www.opto-design.com/products/unibrite>

SUMMARY OF THE INVENTION

Technical Problem

One use of the display apparatus is a use supposing observation from only a specified direction. For the use as above, the amount of light to be emitted from the light source apparatus can be reduced by performing illumination only toward a specified observation position. In other words, the amount of light required for the light source apparatus can be reduced by providing directivity to the light emitted from the light source apparatus.

For example, as a configuration for providing directivity in a light source apparatus as that disclosed in NPL 2, a configuration in which the light-conductive reflection plate provided on the opening of the flatter is replaced with a lens can be conceived. A light source apparatus 100 having such a configuration is illustrated in FIG. 10.

The light source apparatus 100 illustrated in FIG. 10 includes a plurality of light sources 101 such as LEDs, which are arranged on one surface, a plurality of lenses 102 corresponding to the plurality of light sources 101, and a diffusion plate 103 provided so as to face the lenses 102. On optical paths of the light emitted from the light sources 101, the lenses 102 corresponding to the light sources 101 are provided. The lenses 102 parallelize and output the light emitted from the corresponding light sources 10. The light that exits the lenses 102 is diffused in a predetermined angular range by the diffusion plate 103.

The light source apparatus 100 illustrated in FIG. 10 also has problems in that the apparatus configuration becomes larger, that luminance unevenness easily occurs, and that the direction of the directivity changes, the angular distribution of the luminance becomes Gaussian-like, and a top-hat-like uniform distribution is not obtained when the positions of the lenses 102 are shifted, and the like.

An object of the present invention that has been made in view of the above problems is to provide a light source apparatus and a display apparatus capable of emitting light having high directivity and high uniformity.

Means for Solving the Problem

In order to solve the above problems, a light source apparatus according to the present invention is a light source apparatus including: a light emitting body group in which a plurality of light sources that emit directional light are arranged on one surface; and a first diffusing body that is provided on an optical path of the light emitted from the plurality of light sources, and outputs light that enters the first diffusing body in a first predetermined angular range by homogeneously diffusing the light within the first predetermined angular range.

In order to solve the above problems, a display apparatus according to the present invention includes: the above light source apparatus; and a modulation element that modulates light emitted from the light source apparatus.

EFFECTS OF THE INVENTION

According to the light source apparatus and the display apparatus according to the present invention, the light having high directivity and high uniformity is able to be emitted.

DESCRIPTION OF EMBODIMENTS

Embodiments of the present invention are described with reference to the drawings below.

Embodiment 1

Figure 1A:
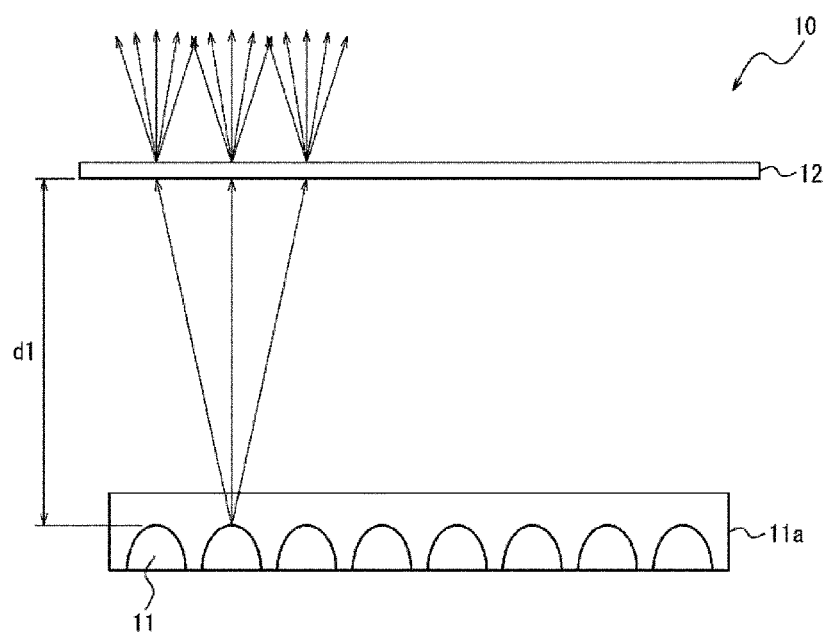
FIG. 1A is a view illustrating a configuration example of a light source apparatus according to Embodiment 1 of the present invention.

FIG. 1A is a view illustrating a configuration example of a light source apparatus 10 according to Embodiment 1 of the present invention.

The light source apparatus 10 illustrated in FIG. 1A includes light sources 11, and a first visual field limiting film 12 serving as a first diffusing body.

The light sources 11 are light sources that emit directional light. The light sources 11 are formed by bullet-shaped LEDs, for example, but are not limited thereto, and freely-selected light sources can be used as long as the light sources can emit directional light. The plurality of light sources 11 are arranged on one surface and form a light source unit 11a serving as a light emitting body group. In this specification, the directional light is light that spreads within a range of about ±10 degrees and preferably within a range of from about ±5 degrees to about ±12 degrees with respect to the center, which is a direction orthogonal to the surface on which the light sources 11 are arranged, for example. The direction in which the light sources 11 emit light is hereinafter described as a front direction. When the spread of light emitted by each of the light sources 11 is too narrow, a distance d1 from the light source 11 to the first visual field limiting film 12 described below needs to be increased. When the spread of light emitted by each of the light sources 11 is too wide, the utilization efficiency of the light decreases. Therefore, the angle of the spread of light emitted by each of the light sources 11 is preferably from about 80% to about 90% of the range (angle) by which the first visual field limiting film 12 described below diffuses light, for example.

The first visual field limiting film 12 is provided so as to be spaced apart from the light sources 11 toward the front direction by the predetermined distance d1, and the light emitted from the plurality of light sources 11 enters the first visual field limiting film 12. In other words, the first visual field limiting film 12 is provided on the optical paths of the light emitted from the plurality of light sources 11.

The first visual field limiting film 12 homogeneously diffuses the light, which enters the first visual field limiting film 12 in a predetermined angular range (diffusion angular range) serving as a first predetermined angular range from the side of the surface facing the light source unit 11a, within the predetermined angular range and outputs the light from the side of the surface opposite to the surface facing the light source unit 11a. The first visual field limiting film 12 has a fine louvered multi-layer structure or a fiber array structure, for example, and propagates light (light substantially parallel to the longitudinal direction of the layers or the fibers) in a predetermined angular range and homogenizes the light during the propagation so as to serve as light guide plate optical fibers substantially parallel to the longitudinal direction of the layers or the fibers. The first visual field limiting film 12 transmits light that does not satisfy conditions for the propagation without changing the light. In other words, the first visual field limiting film 12 functions as an angle-limiting homogenization medium that homogenizes the intensity of the light in a certain range of exiting angles. As the first visual field limiting film 12, a product with the name of "Vision Control Film" made by LINTEC Corporation, a product with the name of "Light Control Film (LCF)" made by TOMOEGAWA CO., LTD., or the like can be used.

As the first visual field limiting film 12, a visual field limiting film having a multi-layer structure or a fiber array structure such that the angle by which each of the light sources 11 emits light is included in the diffusion angular range of the first visual field limiting film 12 is used. For example, when the angular range by which each of the light sources 11 emits light is ±12 degrees with respect to the center, which is the direction orthogonal to the surface on which the light sources 11 are arranged, the diffusion angular range of the first visual field limiting film 12 is preferably about ±15 degrees with respect to the center, which is the direction orthogonal to the surface on which the light sources 11 are arranged. In other words, the diffusion angular range in the first visual field limiting film 12 is preferably the same as the angular range by which each of the light sources 11 emits light or wider than the angular range by a predetermined value (for example, about 2 or 3 degrees). As a result, the light emitted from the light sources 11 can be efficiently used.

When the first visual field limiting film 12 has a multi-layer structure, the first visual field limiting film 12 can only diffuse light in one direction (a predetermined angular range including the direction of the entering light on a plane spanned by the normal line of a layer forming the first visual field limiting film 12 and the entering light (one light beam) from the light source 11). Thus, as the first visual field limiting film 12, a visual field limiting film in which two films of which diffusing directions are orthogonal to each other are laminated is preferably used. As a result, the light can be diffused in two directions, that is, the left-right direction and the depth direction of the page of FIG. 1A.

As described above, in this embodiment, the light source apparatus 10 includes the light source unit 11a (light emitting body group) in which the plurality of light sources 11 that each emit directional light are arranged on one surface, and the first visual field limiting film 12 (first diffusing body) that is provided on the optical paths of the light emitted from the plurality of light sources 11 and outputs the light that enters the first visual field limiting film 12 at a predetermined angular range by homogeneously diffusing the light in the predetermined angular range.

By outputting the light emitted from the light sources 11 by homogeneously diffusing the light in a predetermined angular range by the first visual field limiting film 12, light having high uniformity and high directivity in the diffusing direction of the first visual field limiting film 12 can be emitted.

Figure 1B:
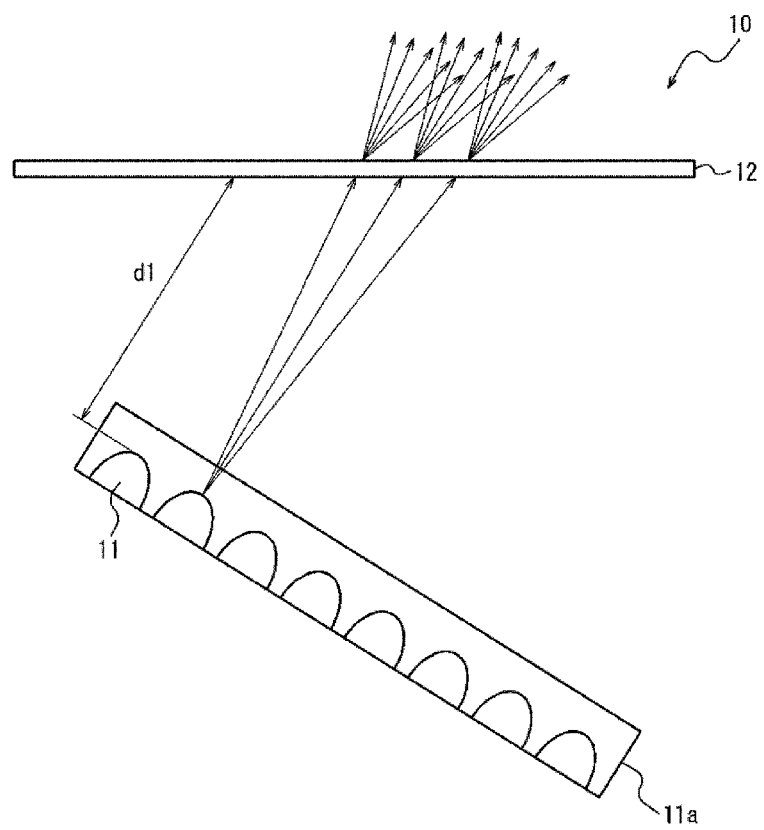
FIG. 1B is a view illustrating another configuration example of the light source apparatus according to Embodiment 1 of the present invention.

As illustrated in FIG. 1B, in the light source apparatus 10 according to this embodiment, the light source unit 11a may be disposed so as to be tilted with respect to the first visual field limiting film 12.

In the light source apparatus 10 illustrated in FIG. 1B, as the first visual field limiting film 12, for example, a visual field limiting film in which a film that performs diffusion within a range of ±15 degrees in the front-rear direction with respect to the normal line of the first visual field limiting film 12 for the direction perpendicular to the page and a film that performs diffusion within a range of ±15 degrees with respect to the direction (the central axis of the directivity) of light beams emitted from the light sources 11 for the in-page direction are laminated can be used. By rotating the light source unit 11a to the in-page direction by 40 degrees with respect to the first visual field limiting film 12, the direction of the light beams emitted from the light sources 11 and the diffusing direction of the light of the first visual field limiting film 12 can be matched with each other. In the light source apparatus 10 illustrated in FIG. 1B, the distance d1 between the light sources 11 and the first visual field limiting film 12 is defined as a distance between the light source 11 that is the closest to the first visual field limiting film 12 and the first visual field limiting film 12.

Figure 1C:
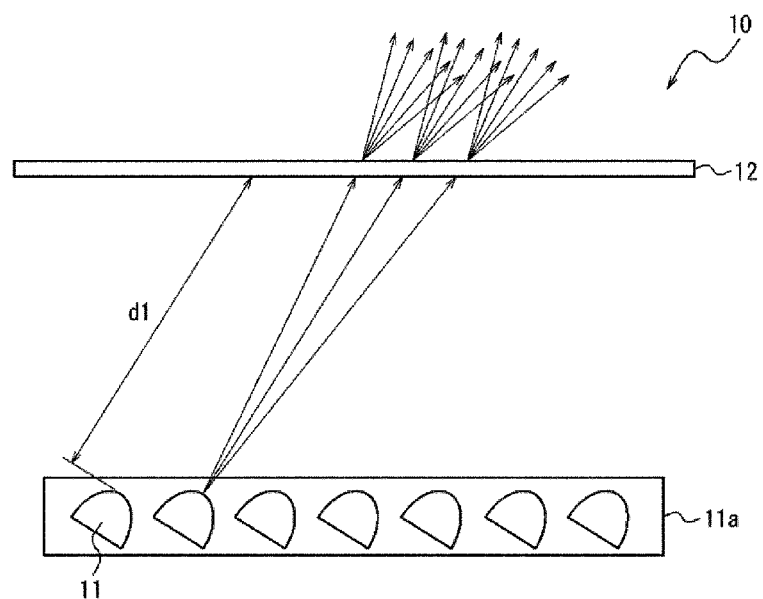
FIG. 1C is a view illustrating another configuration example of the light source apparatus according to Embodiment 1 of the present invention.

As illustrated in FIG. 1C, in the light source apparatus 10 according to this embodiment, the light sources 11 may be disposed so as to be tilted with respect to the first visual field limiting film 12. In other words, the light source unit 11a may be disposed so as to be parallel to the first visual field limiting film 12, and the plurality of light sources 11 may be disposed so as to be tilted with respect to the first visual field limiting film 12.

In the light source apparatus 10 illustrated in FIG. 1C, the first visual field limiting film 12 described with reference to FIG. 1B can be used as the first visual field limiting film 12. By rotating the plurality of light sources 11 forming the light source unit 11a by 40 degrees in the in-page direction, the direction of the light beams emitted from the light sources 11 and the diffusing direction of the light of the first visual field limiting film 12 can be matched with each other.

A plurality of regions in which the plurality of light sources 11 are arranged in one or a plurality of lines may be prepared, and each of the regions may be disposed so as to be tilted with respect to the first visual field limiting film 12.

Embodiment 2

Figure 2:
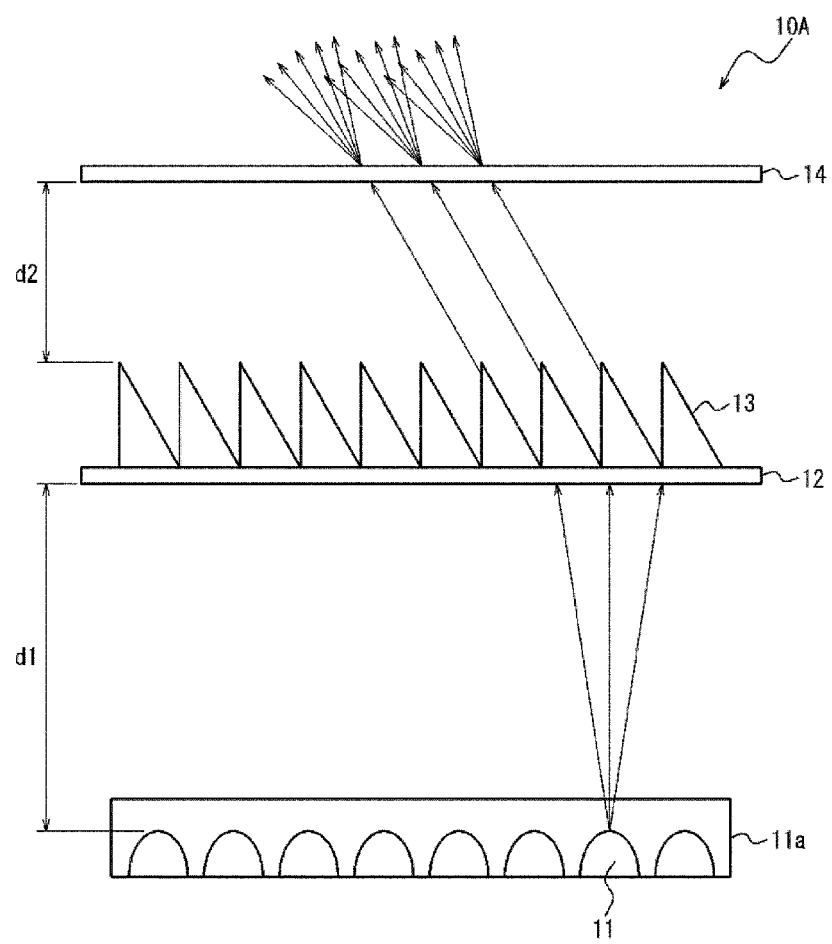
FIG. 2 is a view illustrating a configuration example of a light source apparatus according to Embodiment 2 of the present invention.

FIG. 2 is a view illustrating a configuration example of a light source apparatus 10A according to Embodiment 2 of the present invention. In FIG. 2, configurations similar to those in FIG. 1A are denoted by the same reference characters and descriptions thereof are omitted.

The light source apparatus 10A illustrated in FIG. 2 is different from the light source apparatus 10 illustrated in FIG. 1A in that light deflecting bodies 13 and a second visual field limiting film 14 serving as a second diffusing body are added.

A plurality of the light deflecting bodies 13 are arranged on the surface of the first visual field limiting film 12 on the side thereof opposite to the surface facing the light sources 11. In other words, the plurality of light deflecting bodies 13 are arranged on the light-exiting-surface side of the first visual field limiting film 12. The light deflecting bodies 13 may be provided on the surface of the first visual field limiting film 12 opposite to the surface facing the light sources 11, or may be provided so as to be spaced apart from the surface of the first visual field limiting film 12 opposite to the surface facing the light sources 11. The light deflecting bodies 13 are prisms, for example. Therefore, a prism array in which multiple prisms are arranged is provided on the first visual field limiting film 12 on the exiting-surface side thereof. The light deflecting bodies 13 reflect the light that exits the first visual field limiting film 12 and deflect the light to a predetermined direction.

The second visual field limiting film 14 is provided so as to be spaced apart from the light deflecting bodies 13 by a predetermined distance d2 toward the front direction, and the light deflected by the light deflecting bodies 13 enters the second visual field limiting film 14 from the side of the surface facing the light deflecting bodies 13. The second visual field limiting film 14 homogeneously diffuses the light that enters the second visual field limiting film 14 at a predetermined angular range (diffusion angular range) serving as a second predetermined angular range out of the light deflected by the light deflecting bodies 13 in the predetermined angular range and outputs the light from the side of the surface opposite to the surface facing the light deflecting bodies 13. The second visual field limiting film 14 can be formed by films similar to those of the first visual field limiting film 12.

As the second visual field limiting film 14, a visual field limiting film of which diffusion angular range includes the light deflected by the light deflecting bodies 13 is used. In other words, the diffusion angular range in the second visual field limiting film 14 is preferably the same as the angular range of the light deflected by the light deflecting bodies 13 or wider than the angular range by a predetermined value (for example, about 2 or 3 degrees). As a result, the light deflected by the light deflecting bodies 13 can be efficiently used.

Prisms each having a triangular-prism shape can be used as the light deflecting bodies 13. In this case, a plurality of prisms are disposed in an array-like form. The normal line direction with respect to the triangular bottom surface of each of the prisms is hereinafter referred to as a direction parallel to the prism array, and the direction orthogonal to the direction parallel to the prism array in an installation surface of the prism array is hereinafter referred to as a direction perpendicular to the prism array.

For example, the central direction of the light deflected by the light deflecting bodies 13 is tilted with respect to the direction perpendicular to the installation surface of the prism array by 40 degrees in a plane formed by the direction perpendicular to the installation surface of the prism array, that is, the light deflecting bodies 13 and the direction perpendicular to the prism array (a direction from a certain prism toward an adjacent prism). For the diffusion to the direction parallel to the prism array, the diffusion angular range of the second visual field limiting film 14 is about ±15 degrees with respect to the center, which is the direction perpendicular to the installation surface of the prism array. For the diffusion to the direction perpendicular to the prism array, the diffusion angular range of the second visual field limiting film 14 is about ±15 degrees with respect to the center, which is a direction that is at 40 degrees with respect to the direction perpendicular to the installation surface of the prism array, in a plane formed by the direction perpendicular to the installation surface of the prism array and the direction perpendicular to the prism array. As the second visual field limiting film 14, a visual field limiting film in which two films, that is, a film that performs diffusion in a parallel direction and has a diffusion angular range of about ±15 degrees with respect to the center, which is the direction perpendicular to the installation surface of the prism array, and a film that performs diffusion in a perpendicular direction and has a diffusion angular range in a plane formed by the direction perpendicular to the installation surface of the prism array and the prism array are laminated is used.

In the light source apparatus 10A illustrated in FIG. 2, the light emitted from the light sources 11 is diffused and output in a range of ±15 degrees with respect to the center, which is a direction perpendicular to the surface on which the light sources 11 are arranged, by the first visual field limiting film 12, for example. The light that exits the first visual field limiting film 12 is deflected in a direction that is at 40 degrees with respect to the direction perpendicular to the installation surface of the prism array in a plane formed by the direction perpendicular to the installation surface of the prism array, that is, the light deflecting bodies 13 and the direction perpendicular to the prism array (a direction from a certain prism toward an adjacent prism) by the light deflecting bodies 13, for example. The spreading range of the light deflected by the light deflecting bodies 13 is a range of ±15 degrees with respect to the center, which is a direction at 40 degrees with respect to the direction perpendicular to the installation surface of the prism array, in a plane formed by the direction perpendicular to the installation surface of the prism array, that is, the light deflecting bodies 13 and the direction perpendicular to the prism array, for example. The light deflected by the light deflecting bodies 13 is homogeneously diffused and output by the second visual field limiting film 14. By causing the spreading range of the light deflected by the light deflecting bodies 13 and the diffusion angular range of the second visual field limiting film 14 to be the same, the light that exits the second visual field limiting film 14 can be prevented from further spreading. When end portions of each of the light deflecting bodies 13 (prisms) become dark, unevenness is generated in the light deflected by the light deflecting bodies 13, but such unevenness can be homogenized by diffusing the light deflected by the light deflecting bodies 13 by the second visual field limiting film 14. By the first visual field limiting film 12, the occurrence of moiré due to the plurality of light sources 11 and the plurality of light deflecting bodies 13 can be suppressed without increasing light loss due to the spread of the light.

According to the light source apparatus 10A illustrated in FIG. 2, light having a sharp directivity of ±15 degrees and high uniformity in the in-plane and angular directions can be emitted, for example, by the effect of the first visual field limiting film 12 and the second visual field limiting film 14 described above. In the light source apparatus 10A illustrated in FIG. 2, the first visual field limiting film 12, the light deflecting bodies 13, and the second visual field limiting film 14 do not necessarily need to be strictly aligned with each other. It is desired that the second visual field limiting film 14 be not tilted by an unignorable amount with respect to the parallelism (for example, ±15 degrees) of the second visual field limiting film 14 so that an in-plane rotation of the second visual field limiting film 14 at a degree that is equal to or more than 10 degrees does not occur.

Figure 3:
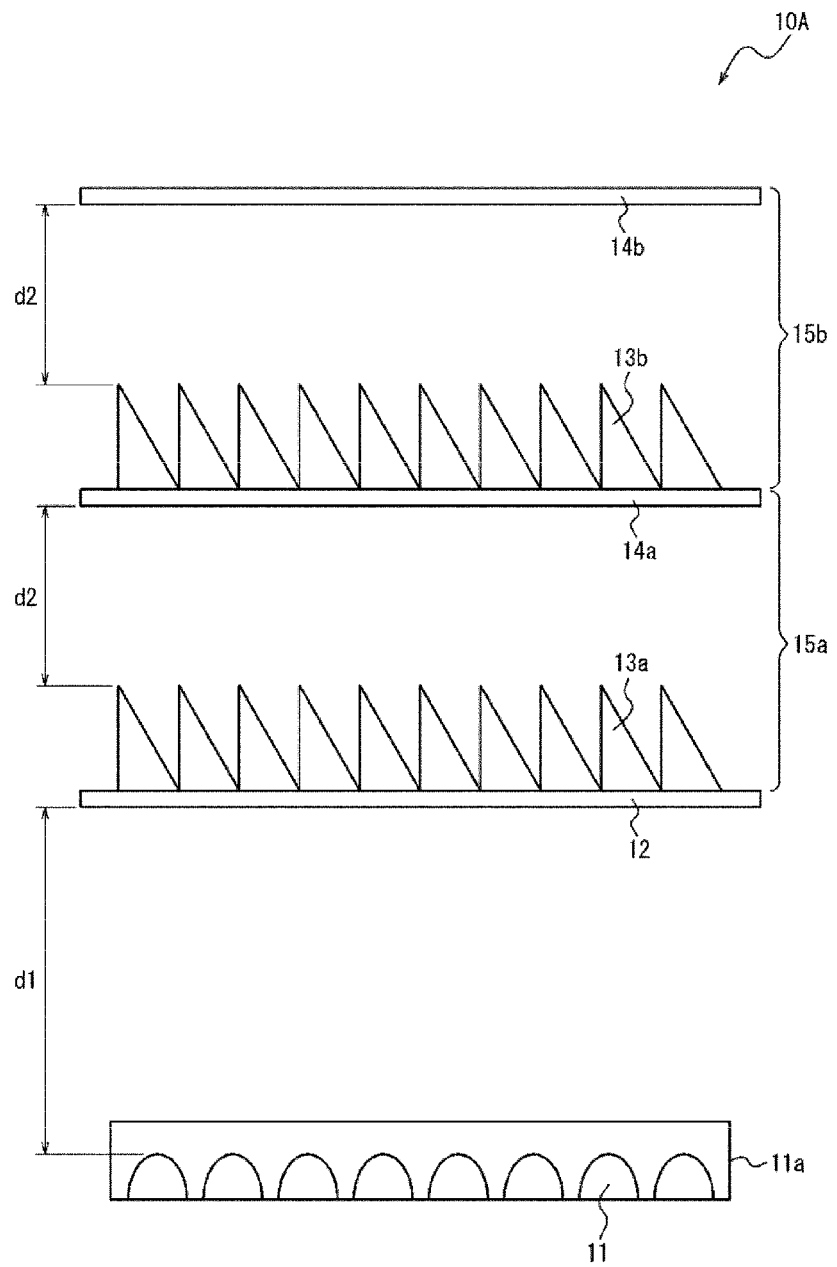
FIG. 3 is a view illustrating another configuration example of the light source apparatus according to Embodiment 2 of the present invention.

As illustrated in FIG. 3, in the light source apparatus 10A according to this embodiment, pairs 15 each formed by the light deflecting bodies 13 and the second visual field limiting film 14 that diffuses and outputs the light deflected by the light deflecting bodies 13 may be hierarchically provided when seen from the light source unit 11a. In FIG. 3, an example in which a pair 15a of light deflecting bodies 13a provided on the first visual field limiting film 12 on the exiting-surface side thereof and a second visual field limiting film 14a that diffuses and outputs the light that exits the light deflecting bodies 13a, and a pair 15b of light deflecting bodies 13b provided on the second visual field limiting film 14a on the exiting-surface side thereof and a second visual field limiting film 14b that diffuses and outputs the light that exits the light deflecting bodies 13b are provided is illustrated.

In the light source apparatus 10A illustrated in FIG. 3, the angle by which the light deflecting bodies 13a deflect the light that exits the first visual field limiting film 12 and the angle by which the light deflecting bodies 13b deflect the light that exits the second visual field limiting film 14a may be different from each other. There is a limit to the angle by which the light deflecting bodies 13 (prisms) can deflect light. Thus, as in the light source apparatus 10A illustrated in FIG. 3, by hierarchically providing the pairs 15 each formed by the light deflecting bodies 13 and the second visual field limiting film 14 that diffuses and outputs the light deflected by the light deflecting bodies 13, the light can be deflected in a multistage manner, and the light can be emitted to a desired direction.

For example, when the pair 15 of the light deflecting bodies 13 that deflect, at 60 degrees, light of which entry angle with respect to a direction perpendicular to the installation surface of the light sources 11 is 40 degrees and the second visual field limiting film 14 that diffuses the light in a range of ±15 degrees with respect to the center, which is 60 degrees, is added to the light source apparatus 10 illustrated in FIG. 2, directional light at shallow angles, that is, angles from 45 degrees to 75 degrees can be emitted when seen from a direction perpendicular to the installation surface of the light sources 11.

Figure 4:
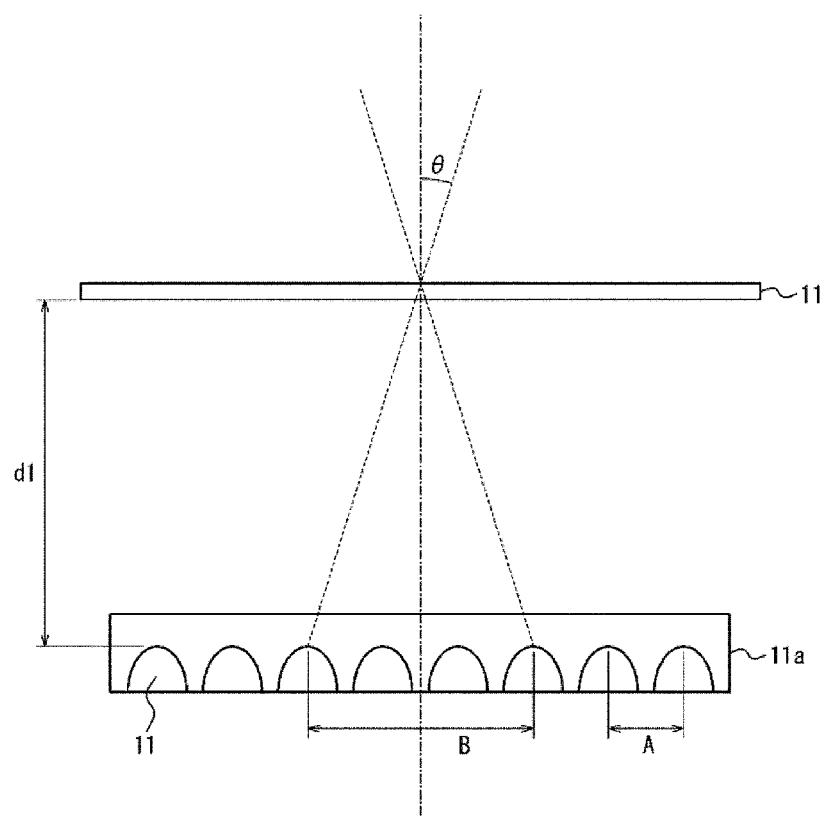
FIG. 4 is a view for describing the relationship between the distance between light sources and a first visual field limiting film and the widths of the light sources in the light source apparatuses illustrated in FIGS. 1A to 1C, FIG. 2, and FIG. 3.

The distance d1 between the light sources 11 and the first visual field limiting film 12 is set such that the width by which the light beam is diffused by the first visual field limiting film 12 is greater than the central interval between two adjacent light sources 11. Also in the light source apparatus 10 according to Embodiment 1, the distance d1 from the first visual field limiting film 12 is set such that the width by which the light beam is diffused by the first visual field limiting film 12 is greater than the width of two adjacent light sources 11. Specifically, as illustrated in FIG. 4, the interval between the adjacent light sources 11 is represented by A, and the diffusion angle of the first visual field limiting film 12 is represented by ±θ. A distance between two contact points between two lines obtained by extending lines corresponding to both ends of the diffusion angle of the first visual field limiting film 12 toward the light sources 11 and a line connecting the vertices of the light sources 11 is represented by B. In FIG. 4, the distance B corresponds to the width by which the light beam is diffused by the first visual field limiting film 12. In this case, B=2d1 tan θ>A is satisfied. As a result, luminance unevenness caused in accordance with the places of the light sources 11 can be homogenized. The distance d1 between the light sources 11 and the first visual field limiting film 12 only needs to satisfy a relationship of B >A but is desired to be B>2A for practical use. Even when the distance d1 from the first visual field limiting film 12 is greater than the width of two adjacent light sources 11, positional displacement is not tolerated when the difference between the two is small. Thus, by letting B>2A to be satisfied (letting d1>A/2 tan θ to be satisfied), a certain degree of positional displacement is also tolerated.

As described above, when the directivity of the light sources 11 is sharp, the distance d1 between the light sources 11 and the first visual field limiting film 12 needs to be increased. When the distance d1 between the light sources 11 and the first visual field limiting film 12 is increased, the spreading width of the light emitted from the light sources 11 becomes greater than the interval between the adjacent light sources 11. When the light sources 11 emit light in a range of ±ζ and the spreading width of the light emitted from the light sources 11 is represented by C, C=2d1 tan ζ>A is satisfied. The distance d1 between the light sources 11 and the first visual field limiting film 12 due to the directivity of the light sources 11 can be reduced by spreading the directivity of the light sources 11 by a directivity diffusion plate such as light shaping diffusers (LSD). In the light source apparatus 10A, the greater one out of the distance d1 with which the width by which the light beam is diffused by the first visual field limiting film 12 becomes equal to or greater than the width of two adjacent light sources 11 and the distance d1 for when the directivity diffusion plate is used is employed.

Figure 5:
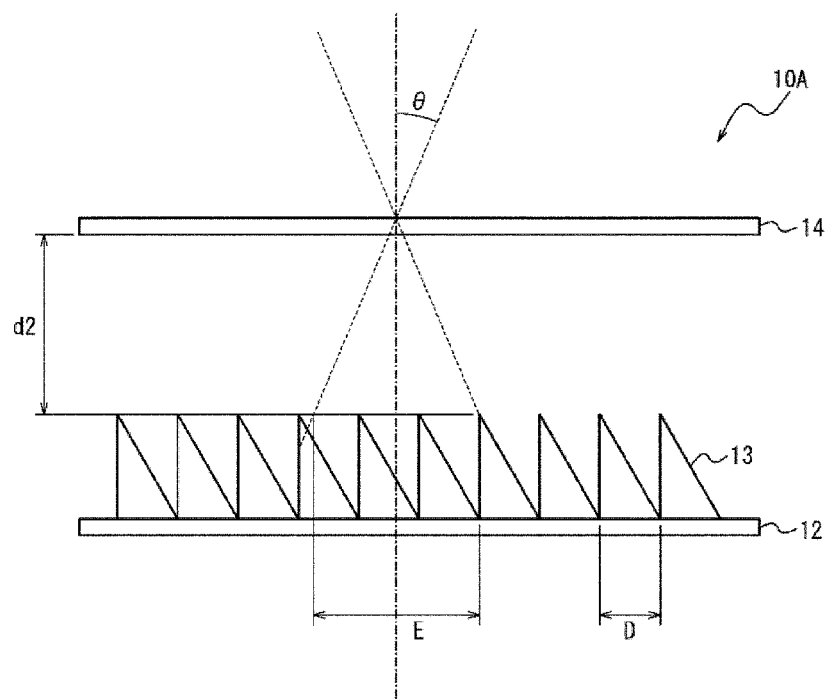
FIG. 5 is a view for describing the relationship between the distance between light deflecting bodies and a second visual field limiting film and the widths of the light deflecting bodies in the light source apparatus illustrated in FIG. 2 and FIG. 3.

The distance d2 between the light deflecting bodies 13 and the second visual field limiting film 14 forming a pair with the light deflecting bodies 13 is set such that the width by which the light beam is diffused by the visual field limiting film 14 is greater than the width (the length in a direction horizontal to the installation surface of the light deflecting bodies 13 (the length in a direction toward the adjacent light deflecting body 13)) of two adjacent light deflecting bodies 13. Specifically, as illustrated in FIG. 5, the width of the light deflecting body 13 is represented by D, and the diffusion angle of the second visual field limiting film 14 is represented by ±θ. A distance between two contact points between two lines obtained by extending lines corresponding to both ends of the diffusion angle of the second visual field limiting film 12 toward the light deflecting bodies 13 and a straight line connecting the vertices of the light deflecting bodies 13 is represented by E. In FIG. 5, the distance E corresponds to the width by which the light beam is diffused by the second visual field limiting film 14. In this case, E=2d2 tan θ>D is satisfied (d2>D/2 tan θ is satisfied). As a result, luminance unevenness caused by a fine structure of the light deflecting bodies 13 (prism array) arranged by a plurality of numbers can be homogenized.

In Embodiment 1 and Embodiment 2 described above, the light deflecting bodies 13 are described with use of an example in which light is deflected by reflection, but the light deflecting bodies 13 is not limited thereto. The light deflecting bodies 13 may deflect light by refraction. For example, when the light deflecting bodies 13 are prisms, each of the light deflecting bodies 13 deflects light by reflection at the inclined surface of the prism when the inclined surface of the prism is steep, and deflects light by refraction at the inclined surface of the prism when the inclined surface of the prism is gentle (when the angle is an angle with which the light reflected at the inclined surface becomes smaller than the transmitted light).

Figure 6:
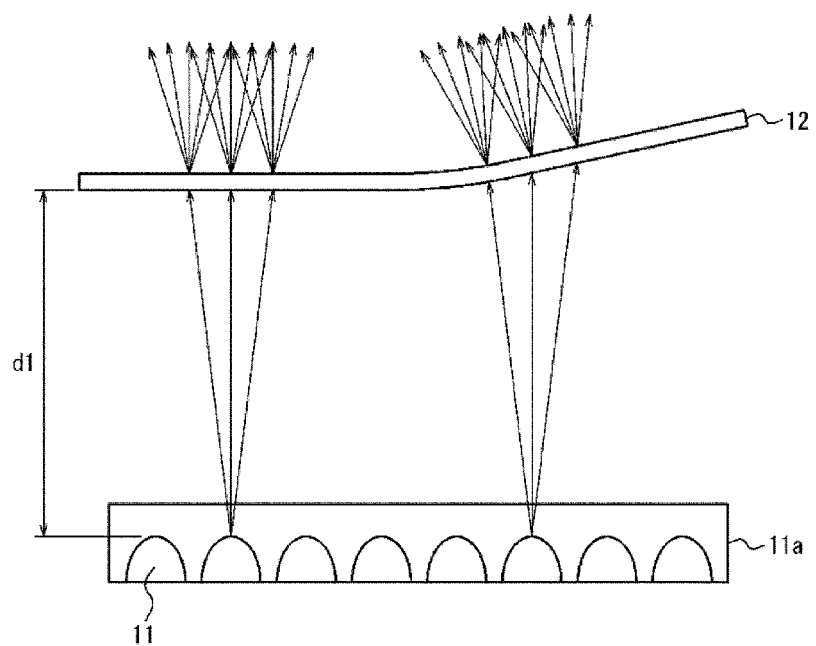
FIG. 6 is a view illustrating an example of disposing visual field limiting films illustrated in FIGS. 1A to 1C, FIG. 2, and FIG. 3.
Figure 7:
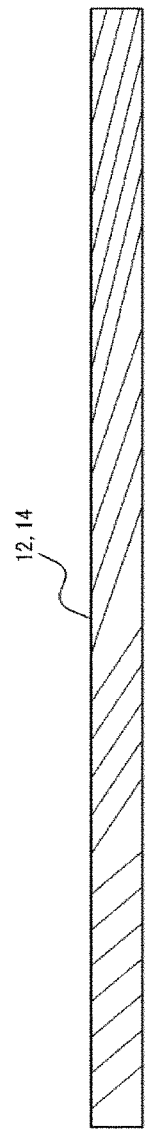
FIG. 7 is a view illustrating a configuration example of the visual field limiting films illustrated in FIGS. 1A to 1C, FIG. 2, and FIG. 3.

In Embodiment 1 and Embodiment 2 described above, the diffusing direction may be changed in accordance with the places of the light sources 11 (for example, concentrate light for a specific viewpoint). In this case, for example, the visual field limiting films (the first visual field limiting film 12 and the second visual field limiting film 14) only need to be bent. For example, as illustrated in FIG. 6, by physically curving the visual field limiting film so as to stick the visual field limiting film on a curved acrylic board, the diffusing direction can be changed in accordance with the places of the light sources 11. In FIG. 6, only the first visual field limiting film 12 is illustrated, but the second visual field limiting film 14 may also be curved. As illustrated in FIG. 7, a visual field limiting film of which layer structures differ depending on the place may be used.

The directivity can be greatly changed by changing the deflection angles of the light deflecting bodies 13 in accordance with the diffusing direction of the visual field limiting film or changing the angles of the light sources 11 in accordance with the diffusing direction when the diffusing direction is changed in accordance with the places of the light sources 11.

In FIG. 1A, FIG. 2, and FIG. 3, an example in which the plurality of light sources 11 and the visual field limiting films (the first visual field limiting film 12 and the second visual field limiting film 14) are disposed to be parallel to each other is illustrated, but examples are not limited thereto. By disposing the plurality of light sources 11 and the visual field limiting films (the first visual field limiting film 12 and the second visual field limiting film 14) to be tilted, directivity in a diagonal direction can be realized without using the light deflecting bodies 13.

For example, in an LED illumination apparatus, an illumination cover made of plastic that covers an LED may be provided. The illumination cover is for diffusing light in all directions in a room and the like in which the LED illumination apparatus is installed. Meanwhile, the visual field limiting films (the first visual field limiting film 12 and the second visual field limiting film 14) in the light source apparatuses 10 and 10A according to the present invention are not only for diffusing light, but are for homogeneously diffusing and emitting light in a predetermined angular range and are completely different from the illumination cover in the LED illumination apparatus.

A display apparatus using the light source apparatus 10 according to Embodiment 1 or the light source apparatus 10A according to Embodiment 2 described above may be formed. Configuration examples of a display apparatus 1 using the light source apparatus 10 or the light source apparatus 10A are illustrated in FIG. 8 and FIG. 9.

Figure 8:
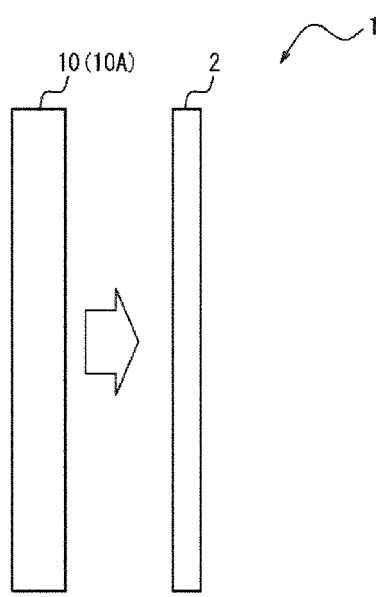
FIG. 8 is a view illustrating a configuration example of a display apparatus using the light source apparatuses illustrated in FIGS. 1A to 1C, FIG. 2, and FIG. 3.

The display apparatus 1 illustrated in FIG. 8 includes the light source apparatus 10 (10A) and a modulation element 2.

The modulation element 2 is provided in the front direction (the light-emitting direction of the light source apparatus 10) when seen from the light source apparatus 10 and modulates and outputs light emitted from the light source apparatus 10. The observer can observe a two-dimensional image from a specified direction by controlling the transmittance of the light by the modulation element 2. The modulation element 2 is a liquid crystal panel, for example.

Figure 9:
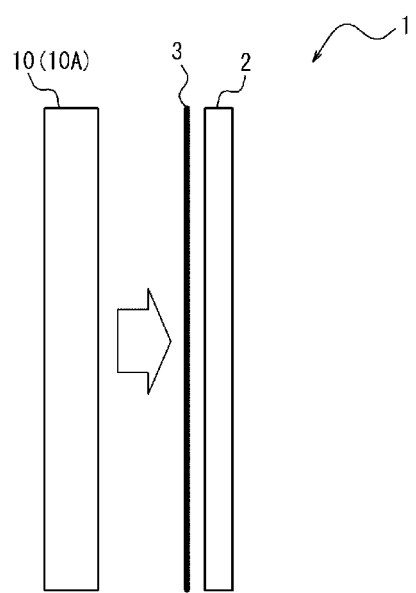
FIG. 9 is a view illustrating another configuration example of the display apparatus using the light source apparatuses illustrated in FIGS. 1A to 1C, FIG. 2, and FIG. 3.
Figure 10:
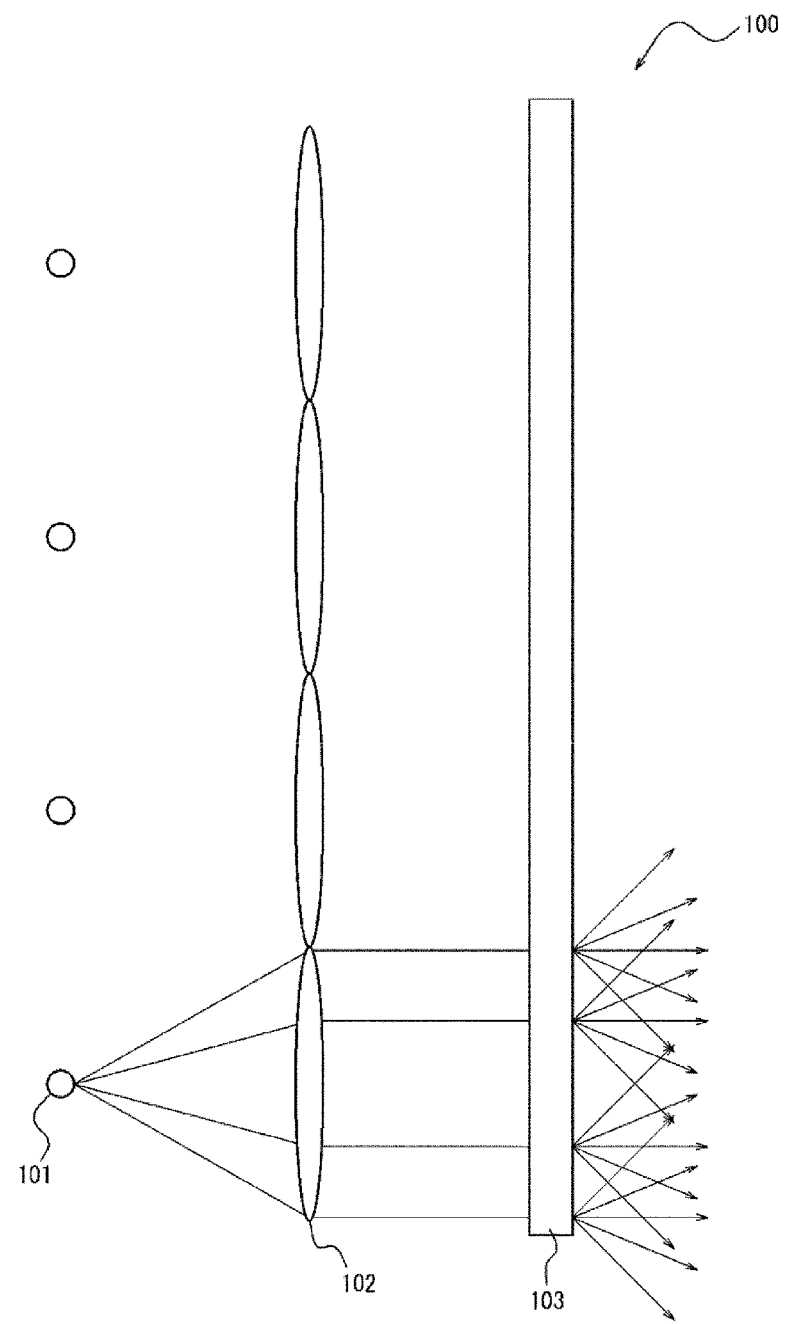
FIG. 10 is a view illustrating a configuration example of a related light source apparatus.

As illustrated in FIG. 9, the observer can observe a three-dimensional image from a specified direction as in the display apparatus disclosed in NPL 2 by providing a parallax barrier 3 between the light source apparatus 10 (10A) and the modulation element 2.

The present invention is not limited to the configurations specified in the above embodiments, and various modifications can be made without departing from the gist of the invention described in the claims.

REFERENCE SIGNS LIST

1 Display apparatus
2 Modulation element
3 Parallax barrier
10, 10A, 100 Light source apparatus
11, 101 Light source
11a Light source unit (light emitting body group)
12 First visual field limiting film (first diffusing body)
13, 13a, 13b Light deflecting body
14, 14a, 14b Second visual field limiting film (second diffusing body)
15a, 15b Pair of light deflecting body and second visual field limiting film
102 Lens
103 Diffusion plate

The invention claimed is:

1. A light source apparatus, comprising:
a light emitting body group in which a plurality of light sources that emit directional light are arranged on one surface;
a first diffusing body that is provided on an optical path of light emitted from the plurality of light sources, and outputs light that enters the first diffusing body in a first predetermined angular range by homogeneously diffusing the light within the first predetermined angular range;
a plurality of first light deflecting bodies that are arranged on the first diffusing body on a light-exiting-surface side of the first diffusing body, and deflect the light output from the first diffusing body in a second predetermined direction; and
a second diffusing body that outputs light that enters the second diffusing body in a second predetermined angular range out of the light deflected by the first light deflecting bodies by homogeneously diffusing the light within the second predetermined angular range,
wherein a distance d1 between the plurality of light sources and the first diffusing body is greater than a greater value out of a value obtained by dividing a central interval A between adjacent two of the light sources by 2 tan θ, where the first predetermined angular range is set as ±θ, and a value obtained by dividing the central interval A between adjacent two of the light sources by 2 tan ζ when an exit range of the light of the plurality of light sources or an exit range of the light after the light of the plurality of light sources is diffused by a directivity diffusion plate is ±ζ; and a distance d2 between the first light deflecting bodies and the second diffusing body forming a pair with the first light deflecting bodies is greater than a value obtained by dividing a width of one of the first light deflecting bodies in a direction toward another of the first light deflecting bodies adjacent to the one of the first light deflecting bodies by 2 tan θ.

2. The light source apparatus according to claim 1, further comprising:
a plurality of second light deflecting bodies that are arranged on the second diffusing body on a light-exiting-surface side of the second diffusing body, and deflect the light output from the second diffusing body in a third predetermined direction; and
a third diffusing body that outputs light that enters the third diffusing body in a third predetermined angular range out of the light deflected by the second light deflecting bodies by homogeneously diffusing the light within the third predetermined angular range.

3. The light source apparatus according to claim 1, wherein the first predetermined angular range is equal to an angular range by which the light sources emit the light or is wider than the angular range by a predetermined value.

4. The light source apparatus according to claim 2, wherein the second predetermined angular is equal to an angular range of the light deflected by the first light deflecting bodies or is wider than the angular range by a predetermined value.

5. A display apparatus, comprising: the light source apparatus according to claim 1; and a modulation element that modulates light emitted from the light source apparatus.

* * * * *